United States Patent Office 2,908,704
Patented Oct. 13, 1959

2,908,704
PROCESS OF PREPARING ISOCYANATES

Benjamin F. Skiles, Wilmington, Del., assignor to E. I. du Pont de Nemours and Company, Wilmington, Del., a corporation of Delaware No Drawing. Application August 7, 1957
Serial No. 676,724

13 Claims. (Cl. 260—453)

This invention relates to an improved process for the preparation of organic isocyanates, particularly of isocyanates which exist as stable liquids at a temperature within the range of 90° C. to about 200° C. under atmospheric pressure.

The organic isocyanates of this invention are, in general, well-known compounds which are of value for various purposes, particularly for use as adhesives when compounded with elastomeric substances, as crosslinking agents in the preparation of plastics, and as intermediates in the formation of polymeric materials. A variety of processes have been proposed for the preparation of these isocyanates which however have many disadvantages, such as slow reaction, low yields, complex procedures, and the production of large amounts of by-products and quite impure isocyanates which are difficult and costly to purify. The more generally accepted processes comprise adding excess phosgene to a solution of primary amine in an inert solvent at a temperature from about −40° C. to about 60° C. whereby there is obtained a mixture of organic carbamyl chloride, amine hydrochloride and some isocyanate and then heating the carbamyl chloride, in the mixture or after separation of the amine hydrochloride, to convert it to the isocyanate; sometimes adding phosgene to the amine hydrochloride, in the mixture or separately, at elevated temperatures to convert it to the isocyanate. See, for example, Schaefer et al. Patent No. 2,640,068, Irwin Patent No. 2,644,007 and Slocombe et al. Patent No. 2,680,127 which disclose such processes and disadvantages thereof.

It is an object of this invention to provide a new and improved process for preparing isocyanates which overcomes many of the disadvantages of the prior processes. A particular object is to provide a novel, improved process for converting the carbamyl chlorides to the isocyanates, and also, preferably, simultaneously converting the amine hydrochloride to the isocyanate. Further objects are to provide a process whereby the isocyanate is obtained in high yield and high purity with savings of cost in both labor and capital investment. Other objects are to advance the art. Still other objects will appear hereinafter.

The above and other objects may be accomplished in accord with this invention which comprises phosgenating a solution of a primary amine in a relatively volatile solvent at a low temperature in the usual manner and then gradually adding the resulting mixture to a liquid body of the isocyanate to be formed at a temperature sufficiently high to cause flash distillation of the solvent and conversion of the carbamyl chloride to the isocyanate. More specifically, the process employs a primary amine which yields an isocyanate that exists as a stable liquid at a temperature within the range of 90° C. to about 200° C. under atmospheric pressure and in which the organic radical in the amine is inert to phosgene, hydrogen chloride and isocyanate groups under those conditions, and the process consists essentially of adding a 25% to about 100% molar excess of phosgene to a solution of about 10% to about 35% by weight of said amine in an inert, organic, liquid solvent at a temperature between about −25° C. and 85° C., and gradually adding the resulting mixture to a body of said isocyanate held at a temperature within the range of 90° C. to about 200° C. at which the isocyanate is a stable liquid and under about atmospheric pressure at a rate such that the solvent is flash distilled from the mixture as fast as it is added to said body of isocyanate, the solvent having a boiling point at least 15° C. below the temperature of the body of isocyanate. In order to obtain the maximum yields of isocyanate of highest purity, it is preferred to bubble phosgene through the body of liquid isocyanate simultaneously with the flash distillation, the phosgene being in excess of that required to convert the amine hydrochloride in the mixture to the isocyanate.

It has been found that, by such procedure, the solvent is more completely and effectively removed from the isocyanate, the conversion of the constituents to the isocyanate is simultaneously obtained rapidly and efficiently with decreased amounts of by-products, and improved yields of purer isocyanate are produced. Also, the amine solutions employed are of considerably higher concentration than those which were practical in prior processes, which results in savings of costs in both operating labor and capital investment.

For the purposes of this invention it is essential that the amine yield an isocyanate which exists as a stable liquid at a temperature within the range of 90° C. to about 200° C. at atmospheric pressure, preferably within the range of 100° C. to about 150° C. In other words, the isocyanate must have a normal boiling point above 90° C., preferably above 100° C. and a melting point below 200° C., usually below 175° C. and preferably below 150° C. Subject to those limitations, the amine may be any member of the large class or classes of aliphatic, cycloaliphatic and aromatic primary mono- and polyamines (containing 1, 2 or more primary amino groups) which are known to the art as suitable for the production of isocyanates by reaction with phosgene to produce carbamyl chlorides and heating to convert the carbamyl chlorides to the isocyanates. Conventionally, the organic radical in the amine will be inert to phosgene, hydrogen chloride and isocyanates under those conditions. See the patents hereinbefore referred to. They may contain nitro, ether such as alkoxy, cyano, halogen, ester, and like groups which are so inert. In general, the aromatic primary amines and the aliphatic primary amines, except the lower alkyl primary amines, have boiling points sufficiently high for the purpose of this invention.

Representative primary amines which are suitable for use in this invention include the aliphatic primary amines such as octadecylamine, 5-cyano-pentylamine, 1-chloroheptylamine, cyclohexyl-1-amino-propyl-3 ether, and aromatic amines such as aniline, toluidine, benzidine, 3,4-dichloroaniline, 2-nitroaniline, 2,5-dimethoxyaniline, 1-naphthylamine, 7,8-dihydro-1-naphthylamine, the phenylene diamines, toluene-2,4-diamine, toluene-2,6-diamine, cumene-2,4-diamine, 1-chloro-2,4-diamino-benzene, the naphthalene diamines, 2,4 - diaminobiphenyl, 4,4' - diamino-diphenylmethane, and 3,3'-dimethyl-4,4'-diamino-diphenylmethane. This invention is particularly adapted for the production of aromatic isocyanates from aromatic primary amines, preferably for the aromatic diisocyanates from the aromatic diamines, especially where the aromatic radical is a hydrocarbon radical.

Also, for the purposes of this invention, it is essential that the organic solvent have a boiling point at least 15° below the temperature at which the flash distillation is to be carried out. Subject to this limitation, the solvent may be any organic solvent or mixture of solvents from the large classes thereof which are known to be suitable for use in the production of isocyanates from primary amines; that is, they must be liquids at the temperature at which the solution is treated with phosgene and inert to the amine, phosgene, hydrogen chloride, and isocyanates. See the patents hereinbefore referred to. Representative solvents which are suitable for use in this invention include esters such as ethyl acetate and butyl acetate; hydrocarbons such as petroleum ether, benzene and cyclohexane; ethers such as diethyl ether, di-n-butyl ether, dioxane and tetrahydrofuran; halogenated hydrocarbons such as chloroform, carbon tetrachloride, ethylene dichloride, trichloroethylene, propylene dichloride, perchloroethylene, monochlorobenzene, monobromobenzene and fluoropentachloroethane; nitrated hydrocarbons such as nitromethane; and the like. Ethyl acetate is the preferred solvent for use with toluene-2,4-diamine.

The concentration of the amine in the solvent should be in the range of about 10% to about 35% by weight. Preferably, the amine concentration will be from about 15% to about 20%, since it has been observed that the higher concentrations sometimes lead to increased tar formation. Tar formation is measured as a ratio of amount of product formed per part of tar obtained. A product to tar ratio of 10:1 or greater is considered acceptable. Amine concentrations materially below 10%, while operable, are not economical because of the large volumes involved and which must be distilled.

The first step of the process is carried out in conventional manner. That is, the solution of the amine in the organic solvent at a temperature between about $-25°$ C. and $85°$ C. is treated with a 25% to about 100% molar excess of phosgene, i.e., 1.25 to about 2 moles, preferably about 2 moles, of phosgene for each mole of the primary amine. Materially larger excesses of phosgene are undesirable only from an economic point of view. Higher temperatures give lower yields. Usually, this first step will be carried out at a temperature of from $-20°$ C. to $25°$ C., but preferably between $-20°$ C. and $0°$ C. Brine temperatures are satisfactory. The phosgene rapidly reacts with the primary amine to form carbamyl chloride, isocyanate and amine hydrochloride. The resulting mixture may be subjected to the flash distillation immediately. However, some improvement in yield is usually obtained if the mixture is held at room temperature for about 8 to about 16 hours before being subjected to the flash distillation, and this procedure is preferred for the production of maximum yields.

In the second and novel step of the process, the mixture from the first step is gradually added to a body, or heel, of the desired isocyanate product which had been previously formed and which is maintained at a temperature within the range of 90 C. to about 200° C. at which the isocyanate is a stable liquid and under about atmospheric pressure, the rate of addition being so regulated that the solvent is flash distilled from the mixture as fast as the mixture is added to said body of isocyanate. The minimum temperature employed in this step is dictated by the temperature required to convert the carbamyl chloride to the isocyanate and by the melting point of the isocyanate, as it is essential that the body of isocyanate be maintained as a liquid. The maximum temperature is dictated by the boiling point of the isocyanate, the temperature at which it tends to decompose, and by economic considerations, whereby unnecessarily high temperatures should be avoided. Usually, the temperature will be from about 100° C. to about 150° C., preferably from about 130° C. to about 150° C. for aromatic isocyanates.

No numerical values can be given for the rate of addition for the phosgenated solvent mixture to the body of liquid isocyanate. The rate is dependent upon the size of the body of liquid isocyanate, its temperature, the capacity and efficiency of the means for heating and maintaining the temperature, the concentration of the amine in the solvent, the difference between the boiling point of the solvent and the temperature of the body of isocyanate, and the capacity and efficiency of the equipment for discharging and recovering the distilled solvent. These are all factors which are familiar to those skilled in the art of flash distillations and which can be controlled by well-known conventional means.

Preferably, phosgene is bubbled through the liquid body of isocyanate during the flash distillation, the phosgene being added at a rate to provide an excess over that required to convert to the isocyanate all of the amine hydrochloride present in the solvent mixture being added to the body of isocyanate. The addition of phosgene in this step tends to inhibit tar formation and ensures the conversion of the amine hydrochloride to the isocyanate. Thereby, maximum yields of crude isocyanate of highest purity are obtained.

The isocyanate produced is thereby added to the body of isocyanate, providing a concentrated crude isocyanate product. Such concentrated crude is discharged from the reactor and can be handled in any conventional manner to give a pure product in good yield. Most often, it will be satisfactory to subject the concentrated crude product to a simple distillation to yield the pure product.

In order to more clearly illustrate this invention, preferred modes of practicing it, and the advantageous results to be obtained thereby, the following examples are given in which the parts are by weight except where specifically stated otherwise:

EXAMPLE 1

Step 1

A solution, containing 16% by weight of toluene-2,4-diamine in dry ethyl acetate, is slowly added to 300 parts of agitated liquid phosgene held at $-20°$ C. so that at the end of 1½ hours, 762 parts of the acetate solution has been added. A white precipitate forms which partially dissolves on standing overnight at room temperature and a slurry of the phosgene-amine reaction product results.

Step 2

The slurry from step 1 is added over a 3 hour period to 163 parts of toluene-2,4-diisocyanate held at 140° C. During the addition, gaseous phosgene is bubbled through the charge at the rate of 50 parts per hour. As fast as the ethyl acetate slurry is added, the ethyl acetate vaporizes and it is removed by condensing the vapors through a distillation column. After the addition of the slurry is completed, the charge is blown with nitrogen to remove excess phosgene and any traces of ethyl acetate. The crude product is then distilled at 97–101° C. at 1.5 mm. pressure of mercury to give 325 parts of high purity toluene-2,4-diisocyanate. This corresponds to 93% of theory based on the meta-toluene diamine used. The ratio of the diisocyanate to tar is 27 to 1, which is considered to be excellent.

EXAMPLE 2

Step 1

A solution of 77 parts of toluene-2,4-diamine in 430 parts of dioxane is added over 45 minutes to a cooled solution (10–20° C.) of 100 parts of phosgene dissolved in 200 parts of dioxane. During the addition, 100 parts of phosgene is bubbled through the charge. The resultant slurry is allowed to stand overnight at room temperature.

Step 2

The slurry of step 1 is added to 240 parts of a heel of toluene-2,4-diisocyanate previously prepared by the same method. The heel is held at 135–140° C. as the slurry is added over a 2 hour period. During the addition, 300 parts of phosgene is bubbled through the charge. As the slurry is added, the dioxane distills off and the diamine-phosgene reaction product is converted to toluene-2,4-diisocyanate. The crude product is distilled to yield 347 parts of toluene-2,4-diisocyanate, which corresponds to 108 parts of diisocyanate formed from the starting diamine or 98.4% of theory.

EXAMPLE 3

Following the general procedure of Example 2, a solution of 53 parts of toluene-2,4-diamine in 1816 parts of diethyl ether is phosgenated and the product added to a heel of previously prepared toluene-2,4-diisocyanate held at 145° C. The toluene-2,4-diisocyanate product is obtained in good yield and a product to tar ratio of 14 to 1 is observed.

EXAMPLE 4

Following the procedure of Example 2, toluene-2,6-diamine is phosgenated in dioxane (17% solution) and, on adding the product to a previously formed heel of toluene-2,6-diisocyanate held at 140° C., a 98% yield of product is obtained and a product to tar ratio of 26 to 1 is observed.

EXAMPLE 5

A 21.4% solution of cumene-2,4-diamine in dioxane is phosgenated and the solvent flashed off according to the procedure of Example 2. An 83% yield of cumene-2,4-diisocyanate is obtained.

EXAMPLE 6

Following the procedure of Example 2, a 19% solution of aniline in ethyl acetate is converted to phenyl isocyanate in 83% yield. The product to tar ratio is 12 to 1.

EXAMPLE 7

When the ethyl acetate of Example 1 is replaced by di-n-butyl ether, the slurry formed was phosgenated and the second step carried out at 170° C., toluene-2,4-diisocyanate was obtained in satisfactory yield.

EXAMPLE 8

In accord with the procedure of the above Example 2, toluene-2,4-diamine is converted to toluene-2,4-diisocyanate, the phosgenation being carried out in a tetrahydrofuran solution containing 18% of the diamine at 0–25° C., and the flash distillation occurring at 150° C.

EXAMPLE 9

In accord with the procedure given in Example 2, a chloroform solution of 15% by weight of toluene-2,4-diamine is phosgenated at 0–25° C. and, in the second step, the solvent flashed off at 130–140° C. After distillation of the crude, pure toluene-2,4-diisocyanate is obtained in acceptable yield.

EXAMPLE 10

The chloroform of Example 9 is replaced with nitromethane and the same process yields pure toluene-2,4-diisocyanate.

EXAMPLE 11

A 33% solution of toluene-2,4-diamine in sec.-butyl acetate is phosgenated at −20° C. as in the above examples and the solvent flashed off in the second step at 145° C. After distillation of the crude, pure toluene-2,4-diisocyanate is obtained.

It will be understood that the preceding Examples are given for illustrative purposes solely, and that this invention is not limited to the specific embodiments set forth therein. On the other hand, it will be apparent to those skilled in the art that, within the limits set forth in the general description, many variations can be made in the primary amines, the solvents, the temperatures and the other conditions and techniques employed without departing from the spirit and scope of this invention.

From the preceding description, it will be apparent that this invention provides a novel process for preparing isocyanates from primary amines which is simple, economical and easy to operate and which produces higher yields of purer product. Also, it permits the use and treatment of considerably more highly concentrated solutions of the amines, which results in material savings of costs in both operating labor and capital investment. Therefore, it is obvious that this invention constitutes a valuable improvement in and contribution to the art.

The embodiments of the invention in which an exclusive property or privilege is claimed are defined as follows:

1. The process for preparing an organic isocyanate which has a normal boiling point above 90° C. and a melting point below 200° C. under atmospheric pressure and in which the organic radical is a member of the class consisting of aliphatic hydrocarbon radicals, cycloaliphatic hydrocarbon radicals, aromatic hydrocarbon radicals and substituted aromatic radicals in which the substituted groups are selected from the class consisting of halogen, nitro, alkoxy and cyano groups, which process consists essentially of adding a 25% to about 100% molar excess of phosgene to a solution of about 10% to about 35% by weight of the corresponding organic primary amine in an inert, organic, liquid solvent at a temperature between about −25° C. and 85° C., and gradually adding the resulting mixture to a body of said isocyanate held at a temperature within the range of 90° C. to about 200° C. at which the isocyanate is a stable liquid and under about atmospheric pressure at a rate such that the solvent is flash distilled from the mixture as fast as it is added to said body of isocyanate, the solvent having a boiling point at least 15° C. below the temperature of the body of isocyanate.

2. The process for preparing an aromatic isocyanate which has a normal boiling point above 90° C. and a melting point below 200° C. under atmospheric pressure and in which the aromatic radical is a member of the class consisting of aromatic hydrocarbon radicals and substituted aromatic radicals in which the substituted groups are selected from the class consisting of halogen, nitro, alkoxy and cyano groups, which process consists essentially of adding a 25% to about 100% molar excess of phosgene to a solution of about 10% to about 35% by weight of the corresponding aromatic primary amine in an inert, organic, liquid solvent at a temperature between about −25° C. and 85° C., and gradually adding the resulting mixture to a body of said isocyanate held at a temperature within the range of 90° C. to about 200° C. at which the isocyanate is a stable liquid and under about atmospheric pressure at a rate such that the solvent is flash distilled from the mixture as fast as it is added to said body of isocyanate, the solvent having a boiling point at least 15° C. below the temperature of the body of isocyanate.

3. The process for preparing an aromatic isocyanate which has a normal boiling point above 90° C. and a melting point below 200° C. under atmospheric pressure and in which the aromatic radical is a member of the class consisting of aromatic hydrocarbon radicals and substituted aromatic radicals in which the substituted groups are selected from the class consisting of halogen, nitro, alkoxy and cyano groups, which process consists essentially of adding a 25% to about 100% molar excess of phosgene to a solution of about 10% to about 35% by weight of the corresponding aromatic primary amine in an inert, organic, liquid solvent at a temperature between about −25° C. and 85° C., gradually adding the resulting mixture to a body of said isocyanate held at a temperature within the range of 90° C. to about 200° C. at which the isocyanate is a stable liquid and under about atmospheric pressure at a rate such that the solvent is flash distilled from the mixture as fast as it is added to said body of isocyanate, the solvent having a boiling point at least 15° C. below the temperature of the body of isocyanate, and simultaneously with said flash distillation bubbling excess phosgene through the body of liquid isocyanate.

4. The process for preparing an aromatic isocyanate which has a normal boiling point above 100° C. and a melting point below 150° C. under atmospheric pressure and in which the aromatic radical is a member of the class consisting of aromatic hydrocarbon radicals and substituted aromatic radicals in which the substituted groups are selected from the class consisting of halogen, nitro, alkoxy and cyano groups, which process consists essentially of adding a 25% to about 100% molar excess of phosgene to a solution of about 10% to about 35% by weight of the corresponding aromatic primary amine in an inert, organic, liquid solvent at a temperature between about −25° C. and 85° C., and gradually adding the resulting mixture to a body of said isocyanate held at a temperature within the range of 100° C. to about 150° C. at which the isocyanate is a stable liquid and under about atmospheric pressure at a rate such that the solvent is flash distilled from the mixture as fast as it is added to said body of isocyanate, the solvent having a boiling point at least 15° C. below the temperature of the body of isocyanate.

5. The process for preparing an aromatic isocyanate which has a normal boiling point above 90° C. and a melting point below 200° C. under atmospheric pressure and in which the aromatic radical is a hydrocarbon radical, which process consists essentially of adding a 25% to about 100% molar excess of phosgene to a solution of about 10% to about 35% by weight of the corresponding aromatic primary amine in an inert, organic, liquid solvent at a temperature between about −25° C. and 85° C., and gradually adding the resulting mixture to a body of said isocyanate held at a temperature within the range of 90° C. to about 200° C. at which the isocyanate is a stable liquid and under about atmospheric pressure at a rate such that the solvent is flash distilled from the mixture as fast as it is added to said body of isocyanate, the solvent having a boiling point at least 15° C. below the temperature of the body of isocyanate.

6. The process for preparing an aromatic isocyanate which has a normal boiling point above 90° C. and a melting point below 200° C. under atmospheric pressure and in which the aromatic radical is a hydrocarbon radical, which process consists essentially of adding a 25% to about 100% molar excess of phosgene to a solution of about 10% to about 35% by weight of the corresponding aromatic primary amine in an inert, organic, liquid solvent at a temperature between about −25° C. and 85° C., gradually adding the resulting mixture to a body of said isocyanate held at a temperature within the range of 90° C. to about 200° C. at which the isocyanate is a stable liquid and under about atmospheric pressure at a rate such that the solvent is flash distilled from the mixture as fast as it is added to said body of isocyanate, the solvent having a boiling point at least 15° C. below the temperature of the body of isocyanate, and simultaneously with said flash distillation bubbling excess phosgene through the body of liquid isocyanate.

7. The process for preparing an aromatic isocyanate which has a normal boiling point above 100° C. and a melting point below 150° C. under atmospheric pressure and in which the aromatic radical is a hydrocarbon radical, which process consists essentially of adding a 25% to about 100% molar excess of phosgene to a solution of about 10% to about 35% by weight of the corresponding aromatic primary amine in an inert, organic, liquid solvent at a temperature between about −25° C. and 85° C., and gradually adding the resulting mixture to a body of said isocyanate held at a temperature within the range of 100° C. to about 150° C. at which the isocyanate is a stable liquid and under about atmospheric pressure at a rate such that the solvent is flash distilled from the mixture as fast as it is added to said body of isocyanate, the solvent having a boiling point at least 15° C. below the temperature of the body of isocyanate.

8. The process for preparing an aromatic isocyanate which has a normal boiling point above 100° C. and a melting point below 150° C. under atmospheric pressure and in which the aromatic radical is a hydrocarbon radical, which process consists essentially of adding a 25% to about 100% molar excess of phosgene to a solution of about 10% to about 35% by weight of the corresponding aromatic primary amine in an inert, organic, liquid solvent at a temperature between about −25° C. and 85° C., gradually adding the resulting mixture to a body of said isocyanate held at a temperature within the range of 100° C. to about 150° C. at which the isocyanate is a stable liquid and under about atmospheric pressure at a rate such that the solvent is flash distilled from the mixture as fast as it is added to said body of isocyanate, the solvent having a boiling point at least 15° C. below the temperature of the body of isocyanate, and simultaneously with said flash distillation bubbling excess phosgene through the body of liquid isocyanate.

9. The process for preparing an aromatic diisocyanate which has a normal boiling point above 90° C. and a melting point below 200° C. under atmospheric pressure and in which the aromatic radical is a hydrocarbon radical, which process consists essentially of adding a 25% to about 100% molar excess of phosgene to a solution of about 10% to about 35% by weight of the corresponding aromatic primary diamine in an inert, organic, liquid solvent at a temperature between about −25° C. and 85° C., and gradually adding the resulting mixture to a body of said diisocyanate held at a temperature within the range of 90° C. to about 200° C. at which the diisocyanate is a stable liquid and under about atmospheric pressure at a rate such that the solvent is flash distilled from the mixture as fast as it is added to said body of diisocyanate, the solvent having a boiling point at least 15° C. below the temperature of the body of diisocyanate.

10. The process for preparing an aromatic diisocyanate which has a normal boiling point above 90° C. and a melting point below 200° C. under atmospheric pressure and in which the aromatic radical is a hydrocarbon radical, which process consists essentially of adding a 25% to about 100% molar excess of phosgene to a solution of about 10% to about 35% by weight of the corresponding aromatic primary diamine in an inert, organic, liquid solvent at a temperature between about −25° C. and 85° C., gradually adding the resulting mixture to a body of said diisocyanate held at a temperature within the range of 90° C. to about 200° C. at which the diisocyanate is a stable liquid and under about atmospheric pressure at a rate such that the solvent is flash distilled from the mixture as fast as it is added to said body of diisocyanate, the solvent having a boiling point at least 15° C. below the temperature of the body of diisocyanate, and simultaneously with said flash distillation bubbling excess phosgene through the body of liquid diisocyanate.

11. The process for preparing an aromatic diisocyanate which has a normal boiling point above 100° C. and a melting point below 150° C. under atmospheric pressure and in which the aromatic radical is a hydrocarbon radical, which process consists essentially of adding a 25% to about 100% molar excess of phosgene to a solution of about 10% to about 35% by weight of the corresponding aromatic primary diamine in an inert, organic, liquid solvent at a temperature between about −25° C. and 85° C., gradually adding the resulting mixture to a body of said diisocyanate held at a temperature within the range of 100° C. to about 150° C. at which the diisocyanate is a stable liquid and under about atmospheric pressure at a rate such that the solvent is flash distilled from the mixture as fast as it is added to said body of diisocyanate, the solvent having a boiling point at least 15° C. below the temperature of the body of diisocyanate, and simultaneously with said flash distillation bubbling excess phosgene through the body of liquid diisocyanate.

12. The process for preparing a toluene diisocyanate from a primary toluene diamine, which process consists essentially of adding a 25% to about 100% excess of phosgene to a solution of about 10% to about 35% by weight of said diamine in an inert, organic, liquid solvent at a temperature between about —25° C. and 85° C., and gradually adding the resulting mixture to a body of said diisocyanate held at a temperature within the range of 90° C. to about 200° C. at which the diisocyanate is a stable liquid and under about atmospheric pressure at a rate such that the solvent is flash distilled from the mixture as fast as it is added to said body of diisocyanate, the solvent having a boiling point at least 15° C. below the temperature of the body of diisocyanate.

13. The process for preparing a toluene diisocyanate from a primary toluene diamine, which process consists essentially of adding a 25% to about 100% excess of phosgene to a solution of about 15% to about 20% by weight of said diamine in an inert, organic, liquid solvent at a temperature between about —25° C. and 85° C., and gradually adding the resulting mixture to a body of said diisocyanate held at a temperature within the range of 100° C. to about 150° C. at which the diisocyanate is a stable liquid and under about atmospheric pressure at a rate such that the solvent is flash distilled from the mixture as fast as it is added to said body of diisocyanate, the solvent having a boiling point at least 15° C. below the temperature of the body of diisocyanate, and simultaneously with said flash distillation bubbling excess phosgene through the body of liquid diisocyanate.

References Cited in the file of this patent

UNITED STATES PATENTS

| | | |
|---|---|---|
| 2,640,068 | Schaefer et al. | May 26, 1953 |
| 2,683,160 | Irwin | July 6, 1954 |
| 2,757,183 | Irwin et al. | July 31, 1956 |